(12) United States Patent
Blais et al.

(10) Patent No.: US 7,497,956 B2
(45) Date of Patent: Mar. 3, 2009

(54) METHOD FOR STABILIZING AND CONDITIONING URBAN AND INDUSTRIAL WASTEWATER SLUDGE

(75) Inventors: Jean-François Blais, Beauport (CA); Guy Mercier, Québec (CA); Patrick Drogui, Sainte-Foy (CA)

(73) Assignee: Corporation Biolix, Quebec (CA)

( * ) Notice: Subject to any disclaimer, the term of this patent is extended or adjusted under 35 U.S.C. 154(b) by 149 days.

(21) Appl. No.: 10/497,059

(22) PCT Filed: Nov. 29, 2002

(86) PCT No.: PCT/CA02/01808

§ 371 (c)(1),
(2), (4) Date: Nov. 29, 2004

(87) PCT Pub. No.: WO03/045852

PCT Pub. Date: Jun. 5, 2003

(65) Prior Publication Data

US 2005/0077245 A1    Apr. 14, 2005

(30) Foreign Application Priority Data

Nov. 29, 2001 (CA) .................... PCT/CA01/01709

(51) Int. Cl.
*C02F 11/14* (2006.01)
(52) U.S. Cl. .............. 210/721; 210/725; 210/727; 210/737; 210/928
(58) Field of Classification Search .......... 210/721
See application file for complete search history.

(56) References Cited

U.S. PATENT DOCUMENTS

| | | | | |
|---|---|---|---|---|
| 4,221,661 A | | 9/1980 | Shimizu et al. | |
| 4,377,486 A | * | 3/1983 | Barrick et al. | 210/712 |
| 4,853,208 A | | 8/1989 | Reimers et al. | |
| 5,051,191 A | * | 9/1991 | Rasmussen et al. | 210/721 |
| 6,248,148 B1 | | 6/2001 | Faulmann et al. | |
| 6,855,256 B2 | * | 2/2005 | Blais et al. | 210/620 |
| 7,166,227 B2 | * | 1/2007 | Karlsson et al. | 210/712 |

FOREIGN PATENT DOCUMENTS

| | | |
|---|---|---|
| CA | 1074925 | 4/1980 |
| JP | 53 110964 | 9/1978 |
| JP | 05 104100 | 4/1993 |
| WO | WO 99/37585 | 7/1999 |
| WO | WO 02/04358 | 1/2002 |

OTHER PUBLICATIONS

Everett, Wat. Res., 1974, vol. 8, pp. 899-906.
Karlsson et al., Wat. Sci. Technol., 1993, vol. 27, No. 5/6, pp. 449-456.
Dollerer et al., Wat. Sci. Technol., 1993, vol. 28, No. 1, pp. 243-248.
Modell, Mater. Techno., 1993, vol. 8, No. 7/8, p. 131-141.

* cited by examiner

*Primary Examiner*—Peter A Hruskoci
(74) *Attorney, Agent, or Firm*—Goudreau Gage Dubuc

(57) ABSTRACT

The invention concerns a method for stabilizing and conditioning wastewater sludge. The invention is characterized in that it consists in treating sludge in an acid environment ($3.0 \leq pH \leq 5.0$), with an inorganic acid and two oxidizing agents, that is a ferric iron salt and hydrogen peroxide. The ferric iron salt is used in such an amount as to obtain a concentration ranging between 5 and 40 kg of Fe per ton of dry sludge; the hydrogen peroxide is used in such an amount as to obtain a concentration ranging between 5 and 40 kg of $H_2O_2$ per ton of dry sludge; mixing the treated sludge for a time interval sufficient to stabilize the sludge and improve its dehydrability; then flocculating the stabilized sludge by adding an organic polymer; then dehydrating the flocculated sludge. Said method enables to significantly improve the dehydrability properties of the sludge while increasing the dry solid content during its mechanical dehydration.

11 Claims, No Drawings

METHOD FOR STABILIZING AND CONDITIONING URBAN AND INDUSTRIAL WASTEWATER SLUDGE

CROSS-REFERENCE TO RELATED APPLICATIONS

This application is a National Entry Application of PCT application no PCT/CA02/01808 filed on 29 Nov. 2002, which itself claims priority on PCT application no PCT/CA01/01709 filed on 29 Nov. 2001. All documents above are incorporated herein in their entirety by reference.

FIELD OF THE INVENTION

The present invention relates to a method for stabilizing and conditioning urban and industrial wastewater sludge. This method enables to significantly improve the characteristics of sludge capacity of dehydration while increasing the dry solid content of the sludge during its mechanical dehydration.

PRIOR ART

Treatment of urban and industrial wastewater results in an increased production of sludge. This sludge of various nature must obviously be eliminated while minimizing risks to human health and the ecosystems. The ways most often used at present time for eliminating this biomass are crop-dusting, sanitary burying and incineration. The final disposal of these rejects is conditioned by various requirements of technical and economical nature.

Incineration and burial, although sometimes necessary, allow only for the elimination of the sludge, without taking advantage of its physical and chemical properties. Moreover, the difficulty encountered in dehydrating sludge in a very performing manner, constitutes an important obstacle in the disposal of the sludge by burial or incineration. The scarceness of sanitary burial sites (rising cost for acceptance) and the very high cost inherent to the incineration of sludge, have during the last few years, increased interest for using sludge as agricultural or woodland fertilizers.

Valorization of agricultural sludge is the preferred option of governmental authorities and it is largely practiced throughout the world. Presently, 30 to 40% of the sludge produced in the world is used for ground fertilization. The integration of performing processes for stabilizing sludge in urban and industrial wastewater treatment plants would enable increased possibilities for valorizing residual sludge from wastewater treatment.

Moreover, the use of a stabilization process that would also enable to improve the possibility of dehydrating sludge would be desirable, on account of the difficulties encountered in this step of treating wastewater sludge. Thus, conditioning of the sludge before its mechanical dehydration is normally carried out through an addition of flocculating agent (organic polymer). Now, the mechanical dehydration of biological sludge thus conditioned remains difficult, so that the final dryness of the dehydrated sludge remains small and therefore involves notable transportation and disposal costs.

Stabilization of sludge in wastewater treatment plants is normally carried out through biological processes involving aerobic or anaerobic digestion. Aerobic digestion is a sludge stabilization technique that is mainly used in wastewater treatment plants of small and medium capacity. Stabilization by aerobic digestion may be used for treating secondary or mixed sludge (primary and secondary). The important energy cost associated with the aeration of the sludge is a factor that limits the use of this technology. During aerobic digestion, aerobic bacteria metabolize the soluble organic matter into carbon dioxide, water and new bacterial cells. When the soluble organic matter is exhausted, the bacterial cells die and thereby release intracellular nutritive elements that are used as nutrients by other organisms. The amount of mineralization of the sludge depends mostly on residence time, temperature, as well as the age of the sludge introduced. A residence time of 14 to 20 days is normally required for an adequate stabilization of the biomass.

Anaerobic digestion is also one of the methods most currently used for the stabilization of urban wastewater sludge. The use of anaerobic digestion for the stabilization of various sludge goes back many decades. In fact, methane fermentation is very efficient in cellular biodestruction. It allows for the elimination of an important quantity of organic materials. Anaerobic digestion of the sludge includes three steps: a) during the first step, the complex organic materials of the solid portion of the sludge are subject to a transformation into complex soluble organic compounds; b) after this solubilization, the complex organic molecules are converted into volatile fatty acids, that are more simple compounds, through anaerobic microorganisms; c) the last step of the serial reaction is a complete mineralization of the volatile fatty acids into methane, carbon dioxide and hydrogen sulfide. During the operation of most urban plants, the three steps of methane fermentation are carried simultaneously in a closed digestion tank. The time of residence of the sludge is of the order of 30 days.

The two techniques for treating sludge, i.e. aerobic and anaerobic digestion, require that digestion tanks of important dimensions be installed, which results in important investment costs. Moreover, the implantation of such systems in plants that are already in operation may be hard to realize in view of the fact that there are few available spaces. One must also take into account that the application of these sludge treatments does not improve its capacity to be dehydrated and may even have an opposite effect.

When the question of reducing the amount of investment becomes a priority, the fermentable power of the sludge may decrease, at least temporarily, by the mere addition of chemical reactants in combination or not with a heat treatment. Liquid or dehydrated sludge may be treated by adding lime. In order to obtain an adequate disinfecting power, the sludge should be brought to pH 12 during at least two hours and preferably during 24 hours. The reduced lime cost, its alkaline character and its favorable effect on the physical structure of the sludge contribute to make it the most often used reactant. The latter technique does not modify the quantity of biodegradable organic materials that are present in the sludge. A fermentation uptake is therefore possible if the later evolution of the conditions of the medium makes it possible. Another disadvantage of this technique is that the body of the sludge is not reduced, on the contrary, it is increased following the addition of alkaline agents. It should also be mentioned that the application of lime treated sludge on agricultural lands is not desirable when the soils are alkaline, as it is the case, for example in most of the western part of the American continent.

Chemical bonding is a sludge stabilization alkaline process that converts sludge into an inert product, that may be used for surface filling of an earth surface or for application on soils. During chemical bonding, a series of chemical reactions take place by combining dehydrated sludge with the chemical reactants, which makes it possible to obtain a solid product that is chemically, biologically and physically stable. The final product is nearly odorless and contains practically no more pathogenic microorganisms. Moreover, the metals that were initially present in the sludge are fixed in the solid product obtained. Two processes of chemical bonding have been patented (U.S. Pat. Nos. 4,853,208 and 6,248,148) and marketed as: Chem-fix and N-Viro Soil. The Chem-fix process uses Portland cement and a sodium silicate to give a sludge based synthetic soil. The N-Viro Soil process uses lime and cement dust as chemical additives. The N-Viro Soil process may also use fly ashes and lime dust. Although these chemical stabilization techniques may appear to be promising alternative solutions, constraints of economical and technical nature, presently restrict the use of these technologies. Moreover, it should be noted that the application of these treatments does not permit to improve the dehydration capacity of the sludge.

To cope with the difficulty of dehydrating sludge and the problems associated with the utilization of the usual processes for digesting sludge, various combined chemical and thermal processes for the stabilization and pre-conditioning of sludge have been developed during the last years. However, these processes remain mostly too costly to be currently used in urban and industrial wastewater purification plants.

Thermal stabilization, also called wet combustion, consists in heating the sludge in the presence of air, under extremely high pressures (up to 20 Mpa and more) for the purpose of providing an extended oxidation of the organic matter, simultaneously as a physical transformation of the colloidal materials (Dollerer and Wilderer, Wat. Sci. Technol., 1993, 28(1) 243-248; Karlsson and Goransson, Wat. Sci. Technol., 1993, 27(5/6), 449-456). This stabilization technology is also used for the thermal conditioning of the sludge. The sludge so treated may, indeed, be easily filtered, while a cake dryness between 40 and 70% is obtained. A process for oxidizing under pressure (22 Mpa) and at high temperature (374° C.) was also proposed for the treatment of biological wastes (Modell, Mater. Techno., 1993, 8(7/8), 131).

Another proposed approach consists in a strong hydrolysis of the organic matter of the sludge by means of a thermal treatment (150 to 160° C.) in acid medium (pH 1 to 2) (Everett, Wat Res., 1974, 8, 899-906). This treatment allows a reduction of about 90% of the meals in suspension and substantially increases the possibility of filtering the non hydrolyzed sludge. After treatment, the sludge and the hydrolysate are neutralized by adding lime, which results in the production of an inorganic sludge containing the extracted heavy metals, an organic sludge that can be used for improving soils, and a liquid fraction that is highly loaded with organic matter, that is recycled at the start of the sludge treatment line.

An increase of the sludge temperature leads to an irreversible transformation of its physical structure, especially if it contains a high proportion of organic and colloidal materials. During heating, the colloidal gels are removed and the particulate hydrophily strongly decreases. The heating temperature used for thermal conditioning varies between 150 and 200° C. and the baking time, between 30 and 60 minutes, depending on the type of sludge and the desired filterability. This treatment mode can be applied with predominantly organic sludge and enables to obtain relatively stable performances as compared to chemical conditioning. Moreover, this treatment makes it possible to obtain an important and rapid thickening of the sludge after baking while a sludge decanted at more than 120 g MES/L and even, in certain cases, at more than 200 g MES/L, is obtained. The structure of the sludge is improved so that filtering without additions of reactants is always possible. In fact, very high dryness of filter-press cakes are reached (<50% ST) with a thermal conditioning. One must also take into account that the thus conditioned sludge is sterilized, and therefor is free of pathogenic microorganisms. Anaerobic digestion of the sludge combined with a thermal conditioning is one of the most interesting avenues, since it permits an optimum reclamation of the biogas (methane). The setting up of thermal pre-conditioning requires however a costly investment as compared to a chemical conditioning. Moreover, this thermal treatment causes the production of a filtrate that is highly loaded with organic matter and ammonium nitrogen that must be recycled at the head of the wastewater purification station. Special precautionary measures should also be taken to limit the disadvantages resulting from the production of odors: covering of layers and containment basins, drain limitation of baking reactors and air deodorization in the main housings (baking, thickening, dehydration).

Fujiyasu et al. (Canadian Patent No. 1,074,925) have for their part provided a process for the chemical conditioning of biological sludge comprising an addition of 0.5% to 30% hydrogen peroxide and the adding of a trivalent (or more) metallic ion, at the rate of 0.5% to 10% with respect to the weight of the dry sludge. This process also comprises an adjustment of the sludge pH during treatment at values between 4 and 9. This conditioning process, that is carried out by adding inorganic products, however does not comprise a subsequent step of sludge flocculation by adding organic polymers before its mechanical dehydration. Now, dehydration of biological sludge on pieces of equipment such as pressing band filters, however calls for the formation of flocks, which however requires the addition of organic polymers. The conditions of treatment proposed by Fujiyasu et al. comprising the addition of high concentrations of hydrogen peroxide and a trivalent ion are such that the subsequent use of an organic polymer is very difficult.

SUMMARY OF THE INVENTION

The present invention therefore aims at providing a new process for stabilizing and conditioning wastewater sludge that is free of the disadvantages and limitations of the prior art processes.

The present invention more particularly aims, on the one band, at improving sludge filtering capacity in order to reduce the water content that is present in the dehydrated sludge, thereby permitting to decrease the volume of the generated sludge, and on the other hand, to stabilize the sludge on a microbiological point of view (destruction of pathogenic microorganisms, elimination of odors). In view of the fact that most of the wastewater purification stations used to treat urban and industrial wastewater are already built and in operation, it is also essential to provide a process that is easily integrated and without important modifications in the chains of treatment of wastewater already in operation. It is notably important to prevent the premature wear of sludge mechanical dehydration equipment resulting from corrosion due to very acid, basic or oxidizing conditions.

The present invention also aims at decreasing the operation cost associated with the stabilization processes that require sludge heating and frequent replacement of equipment due to rapid corrosion. The present invention also concerns a process that can advantageously be carried out at room temperature and therefore without heating, which decreases cost and slows down the corrosion of certain equipment resulting in part from heating during the treatment.

It is therefore an object of the present invention to provide a process for stabilizing and conditioning sludge, characterized in that:

a) the sludge is acidified under conditions to obtain an acidified sludge having a pH between 4.0 and 5.5;
b) tie acidified sludge is treated with an aqueous solution of a ferric iron salt and with hydrogen peroxide, the solution of ferric iron salt being used in an amount to give a concentration that varies between 5 and 40 kg Fe/ton of dry sludge and to acidify the sludge to a pH lower than 5.0 and higher than or equal to 3.0, and hydrogen peroxide being used in an amount to give a concentration that varies between 5 and 40 kg $H_2O_2$/ton of dry sludge;
c) the treated sludge is mixed for a period of time sufficient to stabilize the sludge and improve its capacity of dehydration;
d) the stabilized sludge is flocculated by adding an organic polymer,
e) the flocculated sludge is dehydrated.

Steps (a) and (b) of the process according to the invention may be carried out in one or two treatment stages, which may be easily operated in batch, semi-continuous or continuous mode. Preferably, steps (a) and (b) are carried out by simultaneous addition of inorganic acid and oxidizing agents and in a manner to obtain a pH that is kept between 3 and 5.

Consequently, the invention, according to another aspect, aims at a process of stabilizing and conditioning wastewater sludge, characterized in that:
a) the sludge is treated with an acid and an aqueous solution of a ferric iron salt and hydrogen peroxide in a manner to maintain a pH lower than 5.0 and higher than or equal to 3.0, the solution of ferric iron salt being used in an amount such that a concentration that varies between 5 and 40 kg Fe/ton of dry sludge is obtained and hydrogen peroxide is used in an amount such that a concentration that varies between 5 and 40 kg $H_2O_2$/ton of dry sludge is obtained;
b) the treated sludge is mixed for a period of time sufficient to stabilize the sludge and improve its capacity of dehydration;
c) the stabilized sludge is flocculated by adding an organic polymer; and
d) the flocculated sludge is dehydrated.

DETAILED DESCRIPTION OF THE INVENTION

The process consists in treating a sludge in moderately acid medium (3.0≦pH.<5), with an inorganic acid and two oxidizing agents, i.e. a ferric iron salt and hydrogen peroxide. The ferric iron salt in the form of an aqueous solution is used in an amount such that a concentration that varies between 5 and 40 kg Fe/ton of dry sludge (tbs) is obtained and that the sludge is acidified at a pH lower than 5.0 and higher than or equal to 3.0. Hydrogen peroxide is also used in an amount such that a concentration varying between 5 and 40 $H_2O_2$/tbs is obtained. The addition of the inorganic acid and of the oxidizing agent may be carried out simultaneously, i.e. in a single step, or also in two steps, i.e. an initial acidification of the sludge, followed by the addition of the oxidizing agent.

The acidification of the sludge may be carried out with sulfuric, hydrochloric, nitric, phosphoric acid or a waste acid. Sulfuric acid is preferably used. In the case where the process is carried out in two steps, the initial acidification of the sludge, before adding the oxidizing agents, is normally carried out at a pH between 4.0 and 5.5. The process is clearly less efficient when no acid is added to acidify the sludge below pH 5.5.

The use of a ferric iron salt such as ferric chloride or ferric sulfate allows to decrease acid and hydrogen peroxide consumption. The ferric iron salt accentuates the effect of hydrogen peroxide and allows to reduce the solubilization of the nutritive elements of the sludge, molding phosphorus and this, by precipitation of ferric phosphate. The combined use of a ferric iron salt and hydrogen peroxide leads to the formation of free radicals (OH°), that are highly acid bactericidal species capable of reacting with nearly all the biological molecules. The use of ferric iron salt concentrations higher than 40 kg Fe/tbs causes a bad flocculation of the sludge during the subsequent step of flocculation by addition of an organic polymer. On the other hand, the addition of a ferric iron salt concentration higher than 5 kg Fe/tbs is required to obtain a good efficiency of the process in terms of improvement to the capacity of dehydration of the sludge, as well as in terms of retention of nutritive elements in the dehydrated sludge and, particularly phosphorus.

Preferably, the solution of ferric iron salt is first added to the sludge, and this is followed by hydrogen peroxide.

With respect to hydrogen peroxide, it is necessary to add concentrations higher than 5 kg $H_2O_2$/tbs and this stands for obtaining a good disinfection effect in the sludge (e.g. removal of faecal coliforms), as well as a significant improvement of the possibility of dehydration of the sludge. On the other hand, the addition of concentrations higher than 40 kg $H_2O_2$ involves excessive operating costs and generates too large a hydrolysis of the organic matter present in the sludge, thereby resulting in an important and non desired increase of the concentration of organic matter in solution in the filtrates or supernatants when the sludge is dehydrated.

In the case when the process is carried out in two steps, the subsequent acidification of the sludge at a pH lower than 5.0 and higher than or equal to 3.0 is carried out during addition of the solution of ferric iron salt, which causes a drop in the pH of the sludge. A more pronounced acidification of the sludge (pH<3) causes a premature corrosion to the dehydration equipment and considerably raises the cost of the chemical products. On the other hand, a less important acidification of the sludge (pH≧5.0) produces a loss of efficiency with respect to the destruction of the pathogen indicators (faecal coliforms) and requires the use of higher concentrations of oxidizing agents (ferric iron salt and hydrogen peroxide) to obtain similar gains with respect to the property of dehydration of the sludge (increase in the dryness of the dehydrated sludge). Preferably, the pH of the sludge is kept at a value lower than or equal to 4.58 and higher than or equal to 3.0.

Optionally, the treated sludge can be heated between 25 and 65° C. to increase the performance of the process. The initial content of total solids in the treated sludge is normally between 5 and 50 g/L. The chemical treatment is applied during a period of time that is sufficient to improve the property of dehydration of the sludge and to obtain a good stabilization of the sludge. The time required to reach these objectives is normally between 15 and 240 minutes.

The treated sludge is thereafter flocculated by adding an organic polymer. The use of a pH that is moderately acid, lower than 5.0 and higher than or equal to 3.0, allows not to be required to neutralize the sludge before flocculating it by the addition of polymers, and subsequently, its mechanical dehydration by means of a press filter, a pressing hand filter, a centrifuge, a rotary press, a screw press, etc. Indeed, dehydration pieces of equipment are normally designed to operate at pH values higher than 3.0. Flocculation of acidified sludge at a pH lower than 5.0 and higher than or equal to 3.0 also requires much less polymers (about 0.5 to 3 kg/tbs) than normal flocculation of non treated sludge, or still, re-neutralized sludge at about pH 7 (4 to 10 kg/tbs). The polymer used for flocculating of the treated sludge belongs to the group of organic polymers normally used for the flocculation of sludge in wastewater purification plants. By way of examples, cationic or anionic polymers sold under the trademarks PERCOL and ZIETAG by Ciba Spécialités Chimiques Canadac inc., and LPM by LPM Technologies Inc., may be mentioned. Moreover, the dehydration of slightly acid sludge allows to make it possible to store the sludge for a long period of time without resumption of sludge putrescibility.

Optionally, the sludge may also be completely (pH=7), partially (pH<7) neutralized by adding an alkaline agent before the sludge flocculation step. Complete or partial neutralization of the sludge may also be carried out immediately after its dehydration, or still, after a period during which the dehydrated sludge is stored. The alkaline agent used to neutralize the sludge may be lime, sodium hydroxide, calcium carbonate, ammonium hydroxide, magnesium hydroxide, dolomite or a waste industrial base.

It is also possible to mix the sludge that has had an acid and oxidizing treatment with non treated sludge, and then to flocculate the mixed sludge by adding a polymer and, finally to dehydrate the latter with a norm mechanical dehydration equipment. This type of treatment is particularly performing in the case of an acid and oxidizing treatment of biological sludge (secondary sludge), which is thereafter mixed with non treated primary sludge. Generally, the process may however be used for the treatment of various types of sludge that originate from the treatment of domestic, urban or industrial wastewater (primary, secondary, mixed, paper industry, refineries, agri-food industries, septic tanks, lagoons, de-inking, etc.).

The process according to the invention may be integrated in the present sludge treatment lines that are in operation in wastewater plants, without having to bring about corrective measures to the plants for the treatment and dehydration of sludge already in place. The process allows to significantly improve the sludge capacity of dehydration characteristics by raising the dryness of the sludge during its mechanical dehydration. Moreover, this technology is more performing than the usual mesophilic, aerobic or anaerobic digestion techniques for the destruction of pathogen bacterial indicators (<3 logarithmic units of reduction of faecal coliforms or elimination of more than 99.9%) and therefore allows for an efficient stabilization of the sludge. Finally, the application of this technology has no significant effect on the content of fertilizing elements of dehydrated sludge and allows to considerably reduce the production of odors in the sludge.

The following non-limiting examples illustrate the invention.

EXAMPLE 1

Treatment of Urban Wastewater Sludge

The process according to the invention was tested on wastewater sludge originating from an urban wastewater treatment. The tests were carried out with volumes of 1 L of sludge, that have been placed in glass reactors of 2 L capacity and were stirred with a stirring and heating plate. The initial solid concentration of the sludge used for the tests was 25.4 g/L.

At first, the sludge was acidified by adding concentrated sulfuric acid ($H_2SO_4$ 10 N). Then, a solution of ferric chloride was added ($Fe^{3+}$ 11.0% p/p), followed by hydrogen peroxide ($H_2O_2$ 30% v/v). The sludge was mixed during the addition of the chemical reactants, and also during a period of one hour following these additions. All the tests whose experimental conditions and results are given in Table 1 hereinafter, except for test I, were carried out at room temperature (25±2° C.). In the case of test I, the sludge was first heated at 60±2° C. before adding the chemical reactants. For certain tests (tests A, B and C), the treated sludge was partially neutralized by adding a solution of hydrated lime (50 g/L). In test A, the sludge was neutralized at pH 6.5, while in tests B and C the treated sludge was neutralized at pH 4.0.

After having been treated, the sludge was flocculated by adding a cationic organic polymer sold under the trademark PERCOL E10 and the sludge was filtered under vacuum for a period of 10 min. by means of a dehydration unit comprising a vacuum pump, a buchner and WHATMAN (trademark) membranes no. 90. The dryness of the dehydrated sludge was measured after drying it at 105° C. during a period of 24 h. The filtrates were kept for chemical analyses (chemical demand in oxygen (DCO), ammoniacal nitrogen ($N-NH_4$ and nitrates/nitrites ($N-NO_3/NO_2$)). Samples of non filtered sludge were also preserved for measuring faecal coliforms (CF) by the technique of the most probable number (NPP).

Table 1 presents the experimental conditions used during the tests, as well as the main results of these experiments. The data given in the CONT column correspond to the results of the control test (without treatment) carried out in triplicate and serving as comparison basis for the treated sludge. For tests A, B and C, the pH values and those of oxidation reduction (POR) were measured before neutralizing the sludge with lime. The chemical reactant consumption is given in kilogams of products at 100% per ton of dry sludge (tbs). In the case of ferric chloride, the consumption indicated is in kg of Fe/tbs. The table also gives sludge dryness data after dehydration (% of total solids), as well as the reduction of the mass of sludge to manage (% reduction), with respect to non treated sludge, following the dryness increase of the sludge attributable to the application of the process.

The final pHs measured during the tests are between 2.93 and 4.58, while the final POR values are comprised between 145 and 255 mV. During the test, the consumption of acids used is in the range of 48 to 112 kg $H_2SO_4$/tbs (1.22 to 2.84 g $H_2SO_4$/L). With respect to the addition of ferric chloride, amounts of 7.9 and 15.8 kg Fe/tbs (0.20 to 0.40 g Fe/L) were tested. On the other hand, additions of 11.8 and 19.7 kg of $H_2SO_4$/tbs (0.30 to 0.50 g of $H_2O_2$/L) were carried out during the various tests.

The optimum dose of polymer for flocculating non treated sludge was approximately 5 kg/tbs. By comparison, additions of 1 to 3 kg of polymer/tbs were required for flocculating treated sludge.

The application of the process allows an efficient elimination of the pathogen indicators (faecal coliforms). Thus, a concentration of 17,000 NPP/gph was measured in non treated sludge, while measurements carried out on treated sludge indicated concentrations lower than 10 NPP/gph (<99.94% reduction), except for test E for which the faecal coliform concentration was set up at 130 NPP/gph. This last result is probably explained by the higher pH used when test E was carried out.

DCO, $N-NH_4$ and $N-(NO_3/NO_2)$ measurements in the dehydration filtrates show that the application of the process does not produce a significant solubilization of the organic matter in the sludge, nor a notable loss of the fertilizing value of the sludge.

A mean dryness value of 15.6% (p/p) was measured during the control test for dehydrating non treated sludge carried out in triplicate. Application of the process has allowed to increase the dryness to values between 20.9 and 28.5%, i.e. gains of 5.3 to 12.9 dryness points. This dryness increase of the dehydrated sludge allows to substantially reduce the quantity of dehydrated sludge produced, i.e. between 28.0 and 45.2%.

After treatment, the sludge was flocculated by adding a cationic organic polymer sold under the trademark ZIETAG 7654 and the sludge was filtered under vacuum during a

TABLE 1

Test for preconditioning and stabilizing secondary sludge of an urban wastewater purification station

| | | | | | Tests | | | | | |
|---|---|---|---|---|---|---|---|---|---|---|
| Parameters | CONT | A | B | C | D | E | F | G | H | I |
| final pH | 7.10 | 2.93 | 2.47 | 3.12 | 3.68 | 4.58 | 3.67 | 3.60 | 3.44 | 3.42 |
| POR final (mV) | −218 | 252 | 271 | 217 | 255 | 145 | 248 | 195 | 229 | 237 |
| Temp. (° C.) | 25 | 25 | 25 | 25 | 25 | 25 | 25 | 25 | 25 | 60 |
| Consumption (kg/tbs) | | | | | | | | | | |
| $H_2SO_4$ | 0 | 112 | 112 | 100 | 71 | 48 | 69 | 69 | 70 | 70 |
| $FeCl_3$(Fe) | 0 | 7.9 | 7.9 | 7.9 | 7.9 | 7.9 | 7.9 | 15.8 | 15.8 | 15.8 |
| $H_2O_2$ | 0 | 11.8 | 11.8 | 11.8 | 11.8 | 11.8 | 19.7 | 11.8 | 19.7 | 19.7 |
| Polymer | 5.1 | 3.1 | 1.5 | 1.0 | 2.1 | 2.1 | 3.1 | 2.1 | 2.1 | 1.0 |
| CF sludge (NPP/gph) | 17000 | 7 | <2 | 8 | 7 | 130 | 2 | 4 | 8 | 4 |
| DCO filtrate (mg/L) | 1750 | 1320 | 1820 | 1790 | 1560 | 1530 | 1520 | 1580 | 1550 | 2190 |
| $N-NH_4$ filtrate (mg/L) | 135 | 105 | 151 | 148 | 151 | 147 | 156 | 160 | 163 | 178 |
| $N-(NO_3/NO_2)$ Filtrate (mg/L) | 0.18 | 0.15 | 0.09 | 0.15 | 0.14 | 0.10 | 0.07 | 0.09 | 0.57 | 0.47 |
| Dryness After Dehydration (% w/w) | 15.6 | 23.4 | 22.5 | 23.6 | 21.7 | 20.9 | 22.4 | 21.8 | 24.8 | 28.5 |
| Reduction of Mass of Sludge (% w/w) | — | 33.2 | 30.6 | 33.8 | 28.0 | 25.4 | 30.3 | 28.4 | 37.1 | 45.2 |

EXAMPLE 2

Treatment of Secondary Paper Mill Sludge

The process according to the invention was tested on wastewater sludge derived from the secondary treatment of a paper mill wastewater. The tests were carried out with volumes of 1 L of sludge, which were placed in glass reactors of 2 L capacity and stirred with a stirring and heating plate. The initial concentration of total solids of the sludge used for the tests was 14.1 g/L.

In a first step, the sludge was acidified by adding concentrated sulfuric acid ($H_2SO_4$ 10 N). Then, a dilution of ferric chloride ($Fe^{3+}$ 11.0% p/p) was added, and this was followed by an addition of hydrogen peroxide ($H_2O_2$ 30% v/v). The sludge was mixed during the addition of the chemical reactants, as well as during a period of one hour following these additions. The tests were carried out at temperatures between 25 and 80° C. The sludge was not neutralized before being dehydrated.

period of 10 min. by means of a dehydration unit comprising a vacuum pump, a buchner and WHATMAN (trademark) membranes no. 4. The dryness of the sludge was measured after drying it at 105° C. during 24 h.

Table 2 hereinafter presents experimental conditions used during the tests, as well as the main results of these experiments. The data supplied in column CONT correspond to the results of the control test (without treatment) carried out in triplicate and serving as comparison basis with the treated sludge. The consumption of chemical reactants is given in kilograms of products at 100% per ton of dry sludge (tbs). In the case of ferric chloride, the indicated consumption is in kg of Fe/tbs. The table also gives dryness data of the sludge after its dehydration (% total solids), as well as the percentage of reduction of the mass of sludge to manage, with respect to non treated sludge, following an increase of the dryness of the sludge that is attributable to the application of the process.

TABLE 2

Stabilization and conditioning tests for secondary sludge of a paper mill waste water purification system

| Parameters | CONT | J | K | L | M | N | O | P | Q | R | S | T | U | V |
|---|---|---|---|---|---|---|---|---|---|---|---|---|---|---|
| final pH | 6.51 | 2.95 | 3.44 | 4.22 | 2.91 | 3.34 | 3.80 | 3.43 | 3.96 | 4.57 | 3.31 | 3.74 | 3.36 | 3.64 |
| POR final (mV) | −97 | 404 | 311 | 170 | 359 | 293 | 283 | 311 | 213 | 173 | 440 | 320 | 361 | 290 |
| Temp. (° C.) | 25 | 25 | 40 | 60 | 60 | 60 | 60 | 25 | 40 | 60 | 25 | 25 | 25 | 25 |
| Duration (min) | 60 | 60 | 60 | 60 | 60 | 60 | 60 | 60 | 60 | 60 | 30 | 60 | 120 | 240 |

TABLE 2-continued

Stabilization and conditioning tests for secondary sludge of a paper mill waste water purification system

| Parameters | CONT | J | K | L | M | N | O | P | Q | R | S | T | U | V |
|---|---|---|---|---|---|---|---|---|---|---|---|---|---|---|
| Consumption (kg/tbs) | | | | | | | | | | | | | | |
| $H_2SO_4$ | 0 | 11.7 | 4.7 | 7.0 | 9.3 | 11.7 | 7.0 | 7.0 | 8.2 | 4.7 | 3.0 | 1.5 | 3.0 | 3.0 |
| $FeCl_3$(Fe) | 0 | 8.3 | 10.4 | 7.1 | 14.2 | 8.3 | 10.4 | 7.1 | 7.1 | 7.1 | 13.6 | 13.6 | 13.6 | 13.6 |
| $H_2O_2$ | 0 | 35.4 | 21.2 | 10.6 | 21.2 | 35.4 | 35.4 | 10.6 | 10.6 | 10.6 | 27.8 | 27.8 | 27.8 | 27.8 |
| Polymer | 4.0 | 3.0 | 3.0 | 4.0 | 2.0 | 3.0 | 2.0 | 3.0 | 3.0 | 3.0 | 2.0 | 2.0 | 2.0 | 2.0 |
| Dryness After Dehydration (% w/w) | 6.0 | 13.2 | 20.8 | 15.2 | 22.6 | 16.5 | 20.6 | 14.4 | 13.1 | 14.6 | 13.0 | 14.8 | 14.3 | 12.6 |
| Mass Reduction of Sludge (% w/w) | — | 54.5 | 71.0 | 60.3 | 73.3 | 63.5 | 70.8 | 58.0 | 54.1 | 58.7 | 53.6 | 59.2 | 57.9 | 52.1 |

The final pHs measured during the tests are between 2.91 and 4.57, while final POR values are between 170 and 440 mV. During these tests, the acid consumption used was in the range of 1.5 to 11.7 kg $H_2SO_4$/tbs (0.02 to 0.17 g $H_2SO_4$/L. With respect to the addition of ferric chloride, additions of 7.1 to 14.2 kg Fe/tbs (0.10 to 0.20 g Fe/L) were used. Moreover, concentrations of 10.6 and 35.4 kg $H_2O_2$/tbs (0.15 to 0.50 g $H_2O_2$/:L) were added in the sludge during the different tests. The optimal dose of polymer for flocculating non treated sludge was about 4 kg/tbs. By comparison, additions of 2 to 4 polymer/tbs were required for flocculating treated sludge.

A mean dryness value of only 6.0% (p/p) was measured during the dehydration control test of non treated sludge carried out in triplicate. The application of the process has allowed an increase of the dryness to values between 13.1 and 12.6%, i.e. gains of 6.6 to 16.6 dryness points. This rise in the dryness of the dehydrated sludge allows to strongly reduce the quantity of produced sludge, i.e. between 52.1 and 73.3%. On the other hand, tests aiming at studying the influence of the treatment duration on the dryness of the sludge were carried out (tests S,T,U,V). A treatment duration that varies between 30 and 240 minutes has no significant effect on the dryness of the dehydrated sludge. A mean reaction time of 60 minutes at room temperature was found to be sufficient to eliminate nearly all microorganisms from urban wastewater sludge (Table 1). This time of reaction may be reduced when the treatment is carried out at elevated temperature (40 or 60° C.). Generally, the activity of a disinfectant (such as hydrogen peroxide) increases with temperature. An increase of the temperate results in an increase of chemical and biochemical reaction speeds.

EXAMPLE 3

Continuous Treatment of Paper Mill Sludge

The process according to the invention was also tested in continuous mode and on a pilot scale with mixed wastewater sludge (mixture of primary and secondary sludge) obtained from a secondary treatment of the wastewater of two paper mills (1 and 2). The tests were carried out with stirred vat type reactors having volumes of 1 and 60 $m^3$ of sludge. The initial concentration in total solids of the sludge used for the tests was between 25 and 30 g/L.

The sludge was treated by simultaneously adding, with dosing pumps, sulfuric acid and two oxidizing agents (ferric chloride and hydrogen peroxide) and this, in a single reactor continuously supplied with sludge. A hydraulic retention time (TRH) of 60 min. was used during test W (taper mill 1), while a TRH of 45 min. was used during tests X and Y (paper mill 2). After treatment, the sludge was flocculated by adding a commercial cationic organic polymer and was filtered on an industrial pressing band filter.

Table 3 presents the experimental conditions used during the tests, as well as the main results of these experiments. The data supplied in columns CONT correspond to the results of the control tests (without treatment) serving as comparison basis with the treated sludge.

The average pHs measured during the tests are respectively 4.19 (test W), 4.04 (test X) and 4.02 (test Y). During the tests, the consumption of the acid used was in the range of 18 to 57 kg $H_2SO_4$/tbs. With respect to the addition of ferric chloride, average additions of between 18.7 and 44.1 kg Fe/tbs were tested. On the other hand, average additions of peroxide between 17.6 and 32.1 kg $H_2O_2$ were carried out during pilot tests.

The optimum dose of polymer for flocculating non treated sludge was approximately 6 or 7 kg/tbs. By comparison, additions of 2.2 to 5.4 kg polymer/tbs were required for flocculating the treated sludge.

The application of the process allows an efficient removal of the pathogen indicators (faecal coliforms). Thus, a concentration of 2,300 NPP/gph was measured in non treated sludge (test W), while measurements carried out on treated sludge indicated a concentration lower than 9 NPP/gph (>99.6% reduction).

Measurements of DCO, total phosphorus ($P_t$) materials in suspension (MES), N—$NH_4$ and Kjeldahl nitrogen ($N_{NTK}$) in the dehydration filtrates of the sludge show that the application of the process produces no significant solubilization of the organic matter of the sludge, nor a notable loss of the fertilizing value of the sludge.

Average dryness values comprised between 18.8 and 20.1% (p/p) were measured during control tests for dehydrating non treated sludge. The application of the process allowed to increase the dryness to values comprised between 25.0 and 29.8%, i.e. gains of 6.2 to 9.7 dryness points. This increase in the dryness of the dehydrated sludge allows to significantly reduce the volume of the dehydrated sludge produced, i.e. between 24.8 and 32.5%.

TABLE 3

Tests for continuous pre-conditioning and stabilizing of mixed sludge from paper mill wastewater purification stations

| | Paper mill 1 | | Paper mill 2 | | | |
|---|---|---|---|---|---|---|
| Parameters | CONT | W | CONT | X | CONT | Y |
| Useful volume(m$^3$) | 1 | 1 | 60 | 60 | 60 | 60 |
| Prim./sec. Ratio (% w/w) | 55/45 | 55/45 | 50/50 | 50/50 | 40/60 | 40/60 |
| TRH (min) | 60 | 60 | 45 | 45 | 45 | 45 |
| Mean pH | 6.32 | 4.19 | 7.07 | 4.04 | 7.26 | 4.02 |
| Temp. (° C.) | 25 | 31 | 30 | 33 | n.d. | n.d. |
| Consumption (kg/tbs) | | | | | | |
| $H_2SO_4$ | 0 | 27.1 | 0 | 18.4 | 0 | 56.7 |
| FeCl$_3$(Fe) | 0 | 23.2 | 0 | 44.1 | 0 | 18.7 |
| $H_2O_2$ | 0 | 19.0 | 0 | 32.1 | 0 | 17.6 |
| Polymer | 7.4 | 2.2 | 6.0 | 5.4 | 6.9 | 3.0 |
| CF sludge (NPP/gph) | 2300 | <9 | n.d. | n.d. | n.d. | n.d. |
| DCO filtrate (mg/L) | 1440 | 624 | n.d. | n.d. | n.d. | n.d. |
| P$_t$ filtrate (mg/L) | 7.57 | 0.74 | n.d. | n.d. | n.d. | n.d. |
| N$_{NTK}$ filtrate (mg/L) | 45.1 | 3.91 | n.d. | n.d. | n.d. | n.d. |
| N—NH$_4$ - filtrate (mg/L) | 18.0 | 0.92 | n.d. | n.d. | n.d. | n.d. |
| MES filtrate (mg/L) | 767 | 130 | n.d. | n.d. | n.d. | n.d. |
| Dryness after dehydration (% w/w) | 18.8 | 25.0 | 20.1 | 29.8 | 20.0 | 27.8 |
| Mass reduction of sludge (% w/w) | — | 24.8 | — | 32.5 | — | 28.1 |

The invention claimed is:

1. Process for stabilizing and conditioning wastewater sludge, comprising the steps of:
 a) treating the sludge simultaneously with an inorganic acid and an aqueous solution of a ferric iron salt and hydrogen peroxide to obtain an acidified sludge having a pH comprised between 4.0 and 5.5, the solution of ferric iron salt being used in an amount between 5 and 40 kg Fe/ton of dry sludge and the hydrogen peroxide being used in an amount between 5 and 40 kg $H_2O_2$/ton of dry sludge;
 b) mixing the treated sludge for a period of time sufficient to stabilize the sludge and improve dehydration capacity thereof;
 c) flocculating the stabilized sludge having a pH between 4.0 and 5.0 by addition of an organic polymer; and
 d) dehydrating the flocculated sludge, to produce a stabilized sludge which has reduced odor production during storage wherein the process steps are performed at room temperature to a temperature of 65° C.

2. The process of claim 1, wherein the inorganic acid is selected from the group consisting of sulphuric, hydrochloric, nitric and phosphoric acid.

3. The process of claim 2, wherein the inorganic acid is sulphuric acid.

4. The process of claim 1, wherein the ferric iron salt is ferric chloride.

5. The process of claim 1, wherein the ferric iron salt is ferric sulfate.

6. The process of claim 1, wherein before step (b), the treated sludge is heated at a temperature between 20 and 65° C.

7. The process of claim 1, wherein before step (c), the treated sludge is mixed with non-treated sludge.

8. The process of claim 1, wherein step (c) is carried out for a period of 15 to 240 minutes.

9. The process of claim 1, wherein the sludge has a total solid initial concentration between 5 and 50 g/L.

10. The process of claim 1, wherein the sludge is selected from the group consisting of primary sludge, secondary sludge, mixed sludge, domestic sludge, urban sludge, paper mill sludge, refinery sludge, agri-food industry sludge, septic tank sludge, lagoon sludge and de-inking sludge.

11. The process of claim 1, wherein the process is carried out in continuous mode.

* * * * *